UNITED STATES PATENT OFFICE.

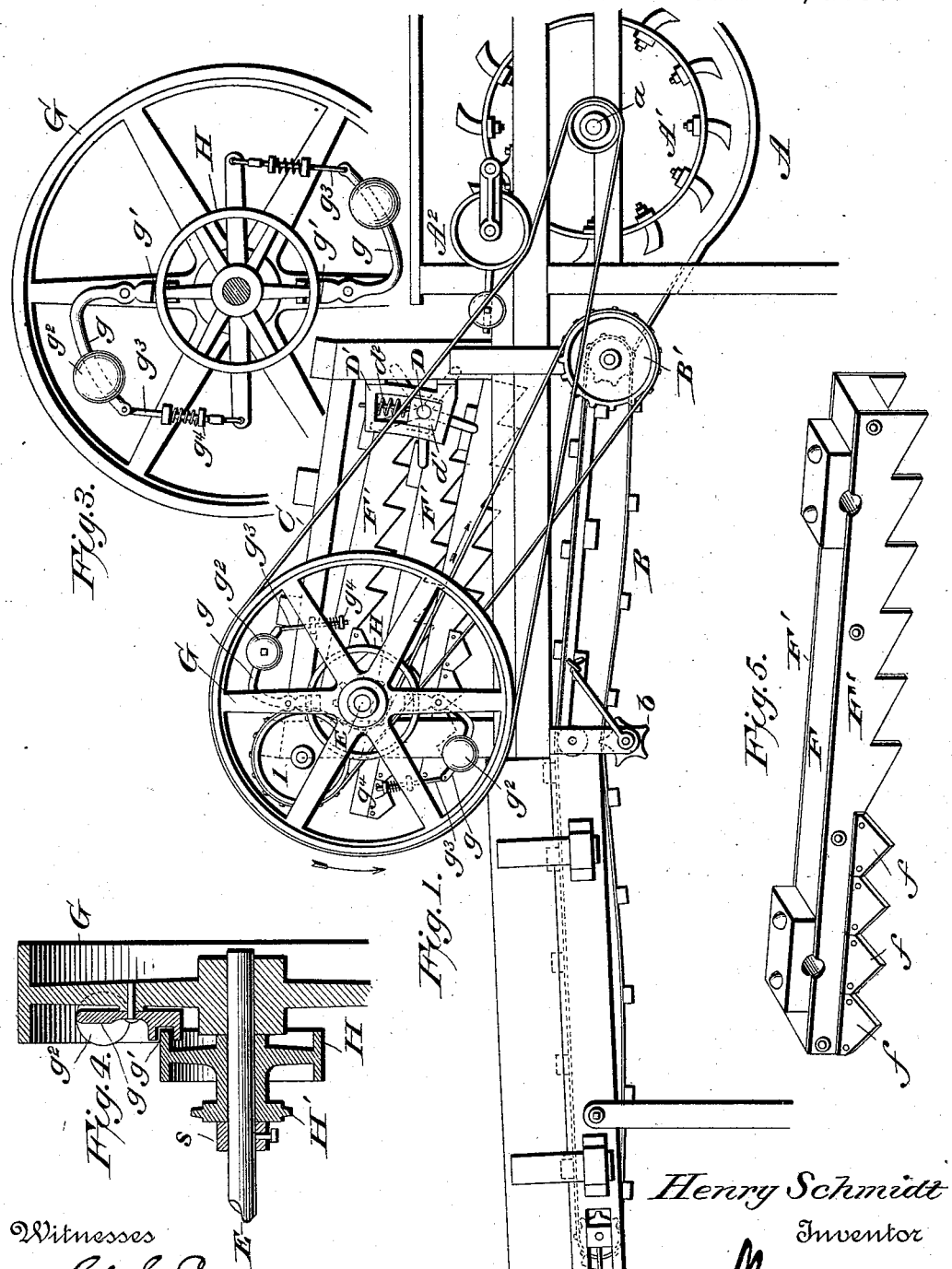

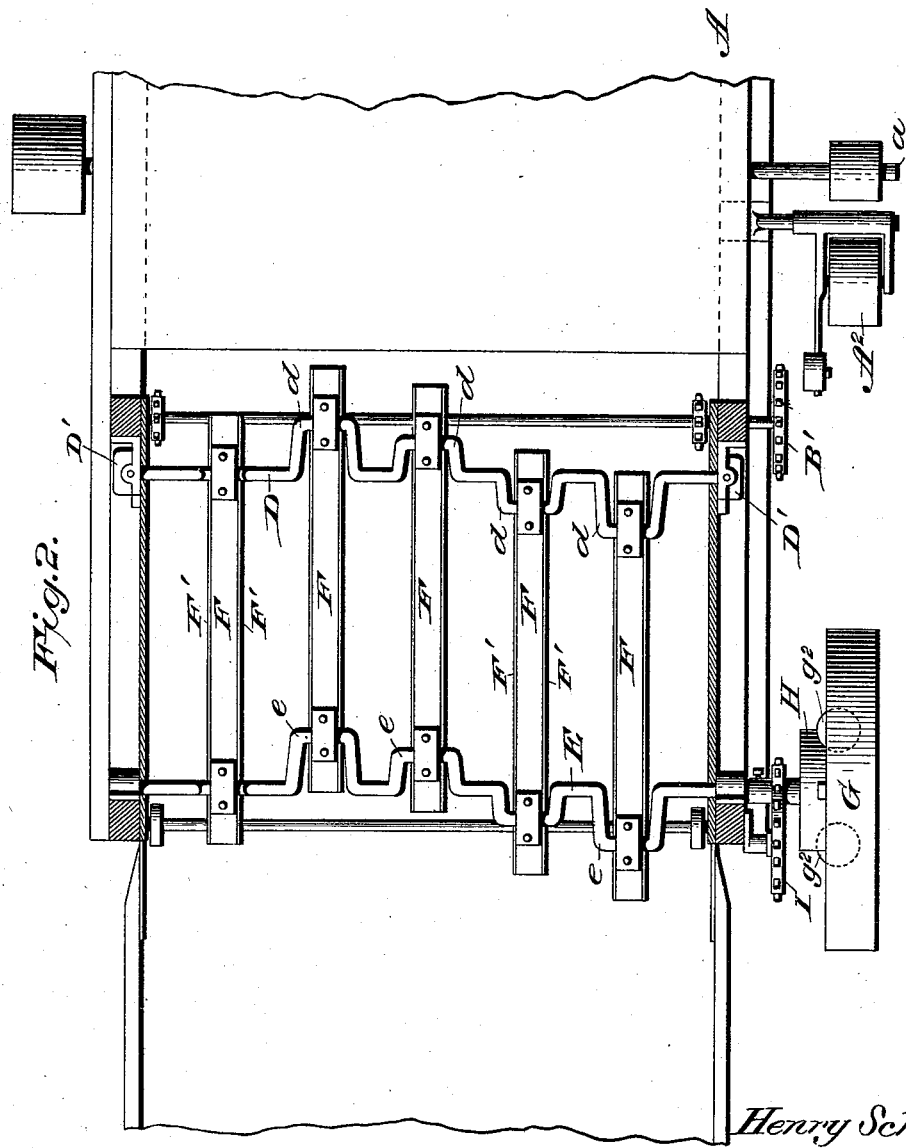

HENRY SCHMIDT, OF NORTH REDWOOD, MINNESOTA.

BAND-CUTTER AND FEEDER.

SPECIFICATION forming part of Letters Patent No. 532,711, dated January 15, 1895.

Application filed June 22, 1894. Serial No. 515,441. (No model.)

*To all whom it may concern:*

Be it known that I, HENRY SCHMIDT, a citizen of the United States of America, residing at North Redwood, in the county of Redwood and State of Minnesota, have invented certain new and useful Improvements in Band-Cutters and Feeders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in band cutters and feeders for thrashing machines, the object being to provide such a device with means whereby the mechanism thereof will be thrown out of gear with the thrashing machine when the latter is running too slow to do effective work and thus avoid choking the thrashing machine by reason of an excessive feed thereto.

In carrying out the invention I provide the main driving pulley of a band cutter and feeder with an automatic clutch which is so constructed that when the driving pulley is driven at a low rate of speed it will be out of engagement with the mechanism which imparts motion to the feeding mechanism; and the invention consists in the construction and combination of the parts, as will be hereinafter fully set forth and particularly pointed out in the claims.

In the accompanying drawings, Figure 1 is a side elevation showing the application of my invention. Fig. 2 is a plan view partly in section. Fig. 3 is a side view of the main driving pulley and a modification of the automatic clutch mechanism carried thereby. Fig. 4 is a sectional view through the drive pulley and clutch mechanism. Fig. 5 is a detail perspective view of one of the band cutter and feed bars, and Fig. 6 is a sectional view through the line 6—6 of Fig. 5.

A designates one end of a thrashing or other grain separating machine, A' being the thrashing cylinder and $a$ the shaft thereof. The thrashing machine is of any approved construction and is provided with a belt-tightener $A^2$, consisting of a roller suitably mounted on an arm of a rock shaft having an adjustable weight, the roller bearing upon the main driving belt which passes over a pulley keyed on the end of the cylinder shaft $a$.

The band cutter and feeder is attached to the frame of the thrashing machine in the usual manner, and the frame of the band cutter and feeder is provided with an endless carrier-belt B the side chains of which pass over sprocket-wheels mounted on transverse shafts, the bearings for one of the end shafts being adjustable in the frame, as shown in Fig. 1. Below the carrier-belt is a grooved roller $b$ which serves as a support for the under side of the carrier-belt, while above the grooved roller is a plain roller which supports the upper part of said belt. The frame of the band cutter and feeder is preferably made in two sections to provide the desired scope of adjustment.

The part C of the frame of the band cutter and feeder is provided with bearings for two transverse shafts D and E, said shafts having corresponding bends or crank portions $d$ and $e$, as shown in Fig. 2, and upon these crank portions, extending from one shaft to the other, are mounted bars F to which are secured the cutting and feeding blades $f$ and F' respectively, the feeding blades F' being rigidly secured to the sides of the bars F and the band cutting blades being preferably riveted to said feeding blades, as shown in Fig. 5.

The shaft D is connected to the end portions of the bars F nearest the thrashing machine and the ends of said shaft are journaled in boxes $d'$ which are movable in segmental housings or brackets D', the boxes being forced to the extent of their downward movement by helical springs $d^2$. Upon one end of the shaft E is rigidly keyed the main driving pulley G adjoining which is mounted a loose pulley H retained in place upon the shaft by a collar $s$. The hub of the pulley H is formed with a sprocket-wheel H' at its inner end, said sprocket-wheel engaging with a sprocket-chain which drives the endless carrier belt B. To two of the spokes of the main driving pulley G are pivoted arms $g$ the inner ends of which are provided with recesses or grooves $g'$ in which turn the rim of the loose pulley H while the outer end portions of the pivoted arms $g$ are bent to one side and provided with adjustable weights $g^2$, the extreme outer ends being pivoted to rods $g^3$ which pass through apertured lugs formed on the adjacent spokes of the driving pulley and are encircled by helical springs which bear against adjusting nuts $g^4$ on the ends of said rods. The springs serve to hold the arms $g$ so that the side walls of the recesses $g'$ will be out of engagement with the rim of the loose pulley H when the pressure of said springs is not overcome by the centrifugal force exerted upon the arms by the rapid rotation of the driving pulley.

The main driving belt passes from the pulley on the cylinder shaft $a$ over the main driving pulley G, and the sprocket-chain which drives the endless carrier belt passes over the sprocket-wheel B' up to and around a sprocket-wheel I journaled in the upper part of the frame C, the upper part of said chain passing partly around the sprocket-wheel formed on the inner end of the loose pulley so that when the loose pulley revolves with the main driving pulley the movement will be communicated to the endless carrier-belt.

The loose pulley H only revolves with the main driving pulley when the latter attains such a degree of speed as to throw the pivoted arms $g$ outward and cause the inner ends of the same to impinge against the rim of the loose pulley.

It will be noted that when the thrashing machine is running at a low rate of speed the carrier-belt is idle, but the bars F which carry the cutting and feeding blades still continue in operation and serve to feed the straw which may be on the carrier-belt to the thrashing-cylinder, so that there will not be an entire cessation in the feed as such cessation would probably result in the too rapid driving of the thrasher.

It is well known that to successfully operate thrashing machines they should be run at a comparatively high rate of speed and when the speed diminishes on account of the mechanism becoming choked or from other causes the feed should be stopped. By my improvement hereinbefore described the feed is regulated and stopped at the proper time, as when the feed of the thrashing machine diminishes the clutches carried by the main driving pulley are automatically thrown out of engagement with the loose pulley which communicates motion to the endless carrier belt.

In Fig. 3 of the drawings I have shown the ends of the rods $g^3$ as connected to an equalizer-bar, which is pivoted centrally upon the shaft between the pulleys G and H, and this equalizer-bar causes the arms $g$ to move positively in unison.

I am aware that prior to my invention it has been proposed to provide a band cutter and feeder with an automatic governor having a sliding clutch which is adapted to engage a clutch carried by a shaft which drives the belt-carrying mechanism so as to propel the same when the thrasher is driven at a predetermined speed, the belt-driving mechanism being disengaged from the thrasher when it is rotated at less than such speed, and I do not therefore claim such invention, but the means for accomplishing the same end as set forth in the following claims.

I claim—

1. In a combined band cutter and feeder for thrashing machines, the combination with the feeding and band cutting mechanism, of a main driving pulley and governor therefor keyed on a shaft, as E, said shaft also carrying a loose pulley which has rigidly connected thereto a sprocket-wheel for driving the feeding belt, bent arms $g$ $g$ pivoted to opposite spokes of the main driving pulley said arms having clutches or recessed ends $g'$ which are adapted to engage with the rim of the loose pulley when the rotation of the main driving pulley is at working speed, weights $g^2$ mounted on the arms $g$ $g$, rods $g^3$ attached to the ends of the arms, and lugs attached to the spokes of the main driving pulley adjacent to those on which the arms $g$ are pivoted, the rods passing through said lugs, and adjusting springs carried by the rods $g^3$ so as to bear against the lugs, the parts being organized substantially as shown and for the purpose set forth.

2. A combined band cutter and feeder, comprising, in combination, a feed table having an endless belt, toothed band cutting and feeding bars F positioned above the endless belt, a shaft D supporting one end of said bars the shaft being journaled in movable bearing blocks, a crank-shaft E carrying the opposite ends of the feed-bars F, a loose pulley H having a sprocket-wheel H' which is in rigid engagement therewith, loosely mounted on the shaft E; a driving-pulley G rigidly attached to the shaft and provided with weighted arms $g$ $g$ having projecting clutches which are disengaged from the rim of the loose pulley H when the rotation of the driving pulley is less than it should be for effective work; a chain which engages with the sprocket-wheel and with one on the driving-shaft of the feed belt, the driving-belt passing over the pulley G and a pulley on the shaft of a cylinder A, substantially as shown, so that when the speed of the thrashing machine is less than it should be for effective work the driving mechanism of the carrier-belt will be automatically cut off from the driving mechanism of the toothed bars.

In testimony whereof I affix my signature in presence of two witnesses.

HENRY SCHMIDT.

Witnesses:
L. A. DOOLITTLE,
H. H. FORSTER.